(12) United States Patent
O'Brien

(10) Patent No.: US 10,967,749 B2
(45) Date of Patent: Apr. 6, 2021

(54) ELECTROSTATIC DISCHARGE SYSTEMS FOR AUTONOMOUS MOBILE ROBOTS

(71) Applicant: iRobot Corporation, Bedford, MA (US)

(72) Inventor: John P. O'Brien, Newton, MA (US)

(73) Assignee: iRobot Corporation, Bedford, MA (US)

( * ) Notice: Subject to any disclaimer, the term of this patent is extended or adjusted under 35 U.S.C. 154(b) by 195 days.

(21) Appl. No.: 16/184,537

(22) Filed: Nov. 8, 2018

(65) Prior Publication Data

US 2019/0202301 A1 Jul. 4, 2019

Related U.S. Application Data

(60) Provisional application No. 62/612,154, filed on Dec. 29, 2017.

(51) Int. Cl.
| | |
|---|---|
| *B60L 53/14* | (2019.01) |
| *G05D 1/02* | (2020.01) |
| *A47L 11/40* | (2006.01) |
| *H05F 3/04* | (2006.01) |
| *G05D 1/00* | (2006.01) |
| *H02N 1/04* | (2006.01) |

(52) U.S. Cl.
CPC ............ *B60L 53/14* (2019.02); *A47L 11/4011* (2013.01); *A47L 11/4066* (2013.01); *A47L 11/4069* (2013.01); *G05D 1/0088* (2013.01); *G05D 1/0225* (2013.01); *H05F 3/04* (2013.01); *A47L 2201/022* (2013.01); *A47L 2201/04* (2013.01); *A47L 2201/06* (2013.01); *G05D 2201/0215* (2013.01); *H02N 1/04* (2013.01)

(58) Field of Classification Search
CPC .... B60L 53/14; G05D 1/0088; G05D 1/0225; G05D 2201/0215; A47L 11/4066; A47L 11/4069; A47L 11/4011; A47L 2201/022; A47L 2201/06; A47L 2201/04; A47L 9/0477; A47L 9/2889; H05F 3/04; H05F 3/02; H02N 1/04; Y02T 10/7072; Y02T 90/14; Y02T 10/70
See application file for complete search history.

(56) References Cited

U.S. PATENT DOCUMENTS

| 4,715,086 A | 12/1987 | Johanson et al. |
| 5,324,948 A * | 6/1994 | Dudar .................. G01S 15/931 250/253 |
| 2012/0047676 A1* | 3/2012 | Jung ........................ A47L 9/30 15/319 |

(Continued)

*Primary Examiner* — David Redding
(74) *Attorney, Agent, or Firm* — Fish & Richardson P.C.

(57) ABSTRACT

An autonomous mobile robot includes a housing infrastructure, a drive system including one or more wheels to support the housing infrastructure above a floor surface, a cleaning assembly, electrical circuitry positioned within the robot housing and an electrostatic discharge assembly including an electrostatic discharge member that includes a metallic contact electrically connected to the electrical circuitry and extending, from the electrical circuitry, to an exterior of the housing infrastructure. The electrical circuitry includes a controller to initiate a cleaning operation in which the drive propels the robot across the floor surface while the cleaning assembly cleans the floor surface.

29 Claims, 10 Drawing Sheets

(56) References Cited

U.S. PATENT DOCUMENTS

| | | | |
|---|---|---|---|
| 2012/0204909 A1* | 8/2012 | Arjomand | B08B 5/04 |
| | | | 134/37 |
| 2015/0113760 A1* | 4/2015 | Fukunaga | A47L 9/248 |
| | | | 15/330 |
| 2016/0183752 A1* | 6/2016 | Morin | A47L 9/1666 |
| | | | 134/18 |
| 2017/0215667 A1* | 8/2017 | Thorne | A47L 5/30 |
| 2018/0338656 A1* | 11/2018 | Carter | A47L 9/0613 |
| 2019/0125154 A1* | 5/2019 | Fay | A47L 9/2826 |

* cited by examiner

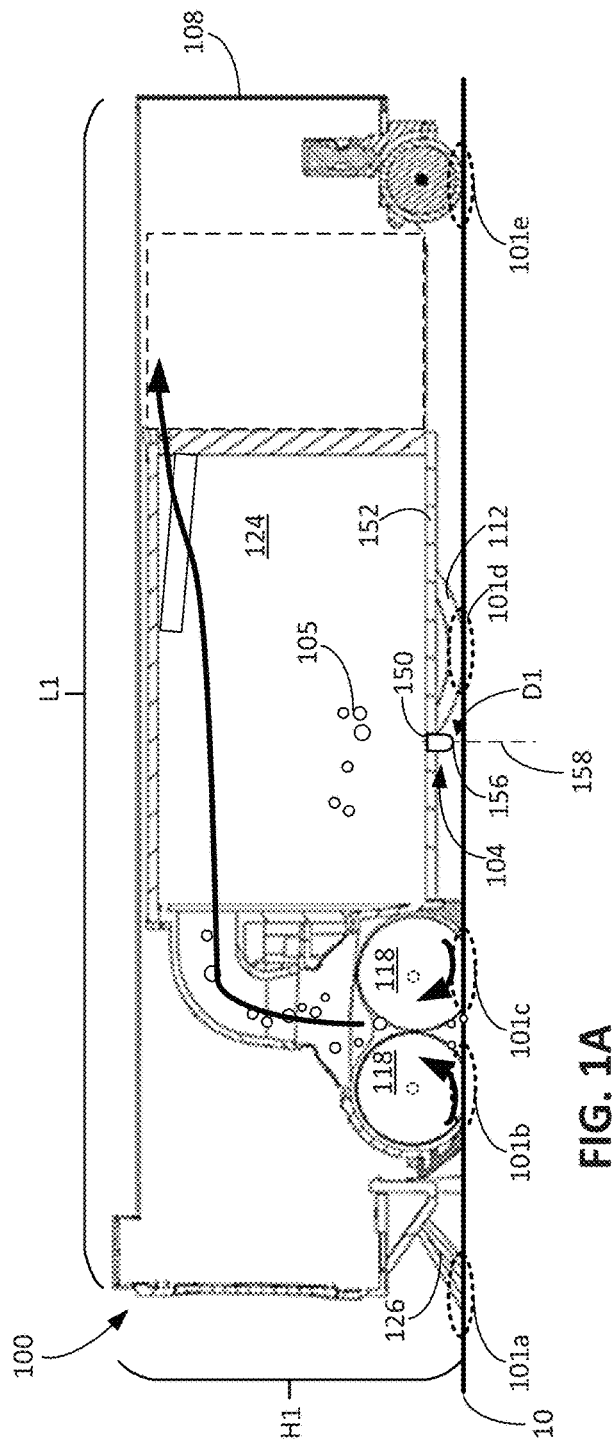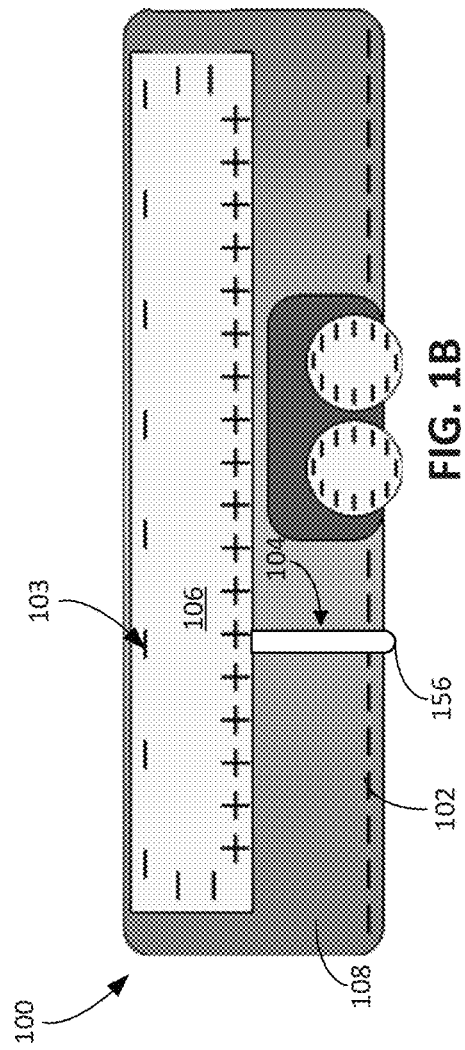

ELECTROSTATIC DISCHARGE SYSTEMS FOR AUTONOMOUS MOBILE ROBOTS

TECHNICAL FIELD

This specification relates to electrostatic discharge systems, in particular, for autonomous mobile robots.

BACKGROUND

Autonomous mobile robots include mobile floor cleaning robots that travel along floor surfaces to clean the floor surfaces. As a mobile floor cleaning robot travels along a floor surface, different portions of the robot contact the floor surface. This contact between the robot and the floor surface, through the triboelectric effect, can cause the robot to accumulate electric charge.

SUMMARY

An autonomous mobile robot can include an electrostatic discharge member, such as a metallic contact comprising a metal bar. The electrostatic discharge member can release electric charge accumulated on the robot as a result of the robot's travel across a floor surface. The electric charge can be released in a controlled manner to prevent the electric charge from otherwise being abruptly discharged in an uncontrolled manner. The electrostatic discharge member can protect sensitive electrical circuitry of the robot from abrupt electrostatic discharge.

The autonomous mobile robot includes one or more wheels to support the housing infrastructure above a floor surface; a cleaning assembly; electrical circuitry positioned within the robot housing, the electrical circuitry including a controller to initiate a cleaning operation in which the drive propels the robot across the floor surface while the cleaning assembly cleans the floor surface; and an electrostatic discharge assembly including an electrostatic discharge member having a metallic contact electrically connected to the electrical circuitry, the electrostatic discharge member extending to an exterior of the housing infrastructure.

In some aspects, the metallic contact protrudes less than 0.5 mm from the exterior of the housing infrastructure. The cleaning assembly comprises one or more rotatable members configured to contact the floor surface during the cleaning operation, thereby causing the robot to accumulate electrostatic charge, and the electrostatic discharge member is configured to dissipate the accumulated electrostatic charge into an environment of the robot. The electrostatic discharge member faces downward toward the floor surface.

In some aspects, a distance between the metallic contact of the electrostatic discharge member and the floor surface is between 0 cm and 1 cm. A height of the robot relative to the floor surface is no more than 13 centimeters, and the electrostatic discharge member is positioned on a bottom portion of the housing infrastructure between the one or more wheels of the drive system and rearward of the cleaning head assembly. The metallic contact of the electrostatic discharge member is aligned with a charging contact for recharging a power system of the robot. The metallic contact of the electrostatic discharge member includes approximately a same lateral length as the charging contact, and where the metallic contact of the electrostatic discharge member is within 1 cm of the charging contact. The electrostatic discharge member is a first electrostatic discharge member and where the metallic contact is a first metallic contact, and where the robot further comprises a second electrostatic discharge member including a second metallic contact that is aligned along a lateral axis with the first metallic contact of the first electrostatic discharge member. The first metallic contact is aligned with a first charging contact for recharging a power system of the robot, where the second metallic contact is aligned with a second charging contact for recharging the power system of the robot, and where widths of the first and second metallic contacts each include approximately a same lateral length as the first and second charging contacts, respectively. The electrostatic discharge member is positioned on a bottom portion of the housing infrastructure within 2 cm of an evacuation port. The electrostatic discharge member is configured to touch a discharge contact of a docking station.

In some aspects, a minimum distance between the metallic contact of the electrostatic discharge member and an exterior wall of the housing infrastructure is at least 1 millimeter. A width of the metallic contact is between 2-5 mm, and where a length of the metallic contact is between 10-50 mm. A distance between the metallic contact of the electrostatic discharge member and a wheel of the drive system is between 1% and 5% of a width of the robot. A distance between the metallic contact of the electrostatic discharge member and a charging contact of the robot is between 1% and 5% of a length of the robot. A bottom surface of the housing is no more than 0.7 cm from the floor surface, and the electrostatic discharge member is positioned above the floor surface such that the electrostatic discharge member does not contact the floor surface during the cleaning operation on the floor surface.

In some aspects, the autonomous mobile robot includes an assembly housing to which the electrostatic discharge member is mounted, the assembly housing including a locator member engaged with a corresponding locator member on the housing infrastructure to inhibit relative movement of the portion of the electrical circuitry and the electrostatic discharge member. In some aspects, the autonomous mobile robot includes a resistor electrically connecting the electrostatic discharge member and the electrical circuitry. An electrical resistance of the electrical resistor is between 1 Kilo-Ohm and 1 Mega-Ohm. The electrostatic discharge member is connected to an electrical ground of the electrical circuitry. The electrostatic discharge member is electrically connected to the electrical circuitry through an electrical wire.

Advantages of the foregoing may include, but are not limited to, those described below and herein elsewhere. For example, the electrostatic discharge assembly can dissipate electrostatic charge that is accumulated by the autonomous mobile robot, for example, during the cleaning operation. This can reduce the likelihood that the electrostatic charge is suddenly discharged in a manner that can damage electrical circuitry of the robot, shock an individual, etc. The electrostatic discharge assembly enables the electrostatic charge to be transferred to a surrounding environment of the robot in a controlled manner that minimizes the risk of damage to the electrical circuitry. The electrostatic discharge assembly enables the autonomous mobile robot to discharge electrostatic charge buildup in a controlled manner when the robot is docking in a docking station. The electrostatic discharge assembly minimizes a risk of arcing or other uncontrolled discharge to the docking station from the robot, and equalizes the electrical potential of the robot and the docking station prior to charging contacts of the robot reaching the docking station.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 1A is a schematic side view of an autonomous mobile robot with an electrostatic discharge assembly during a cleaning operation.

FIG. 1B is a schematic side view of the robot of FIG. 1A, schematically depicting an accumulation of electric charge on the robot.

DETAILED DESCRIPTION

Figure 2A:
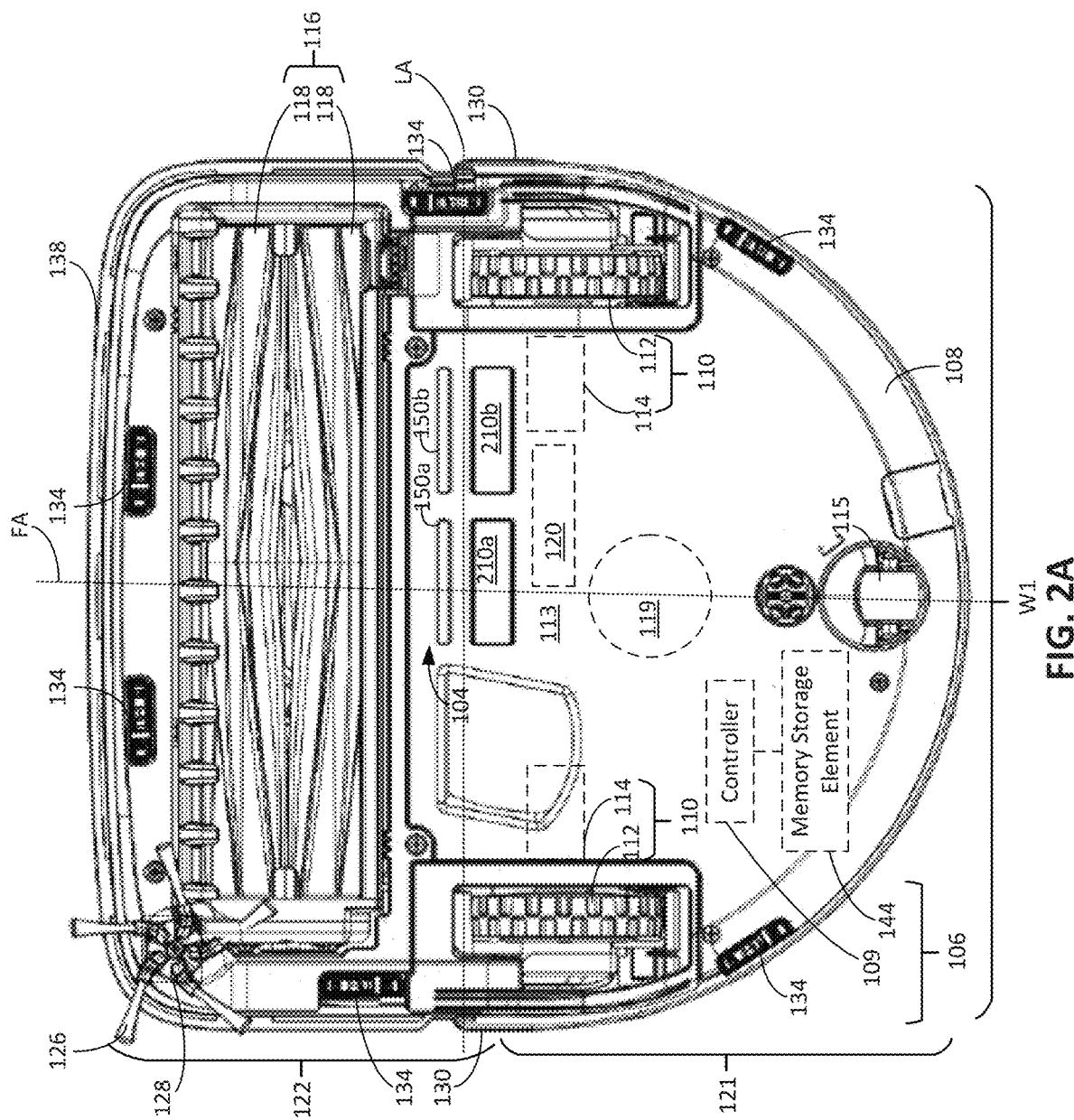
FIGS. 2A-2D are bottom, front perspective, rear bottom perspective, and rear views, respectively, of the robot of FIG. 1A.

Referring to FIG. 1A, an autonomous mobile robot 100 autonomously moves about a floor surface 10 in an environment, e.g., a room, an office, or other enclosed space. For example, the robot 100 is an autonomous mobile floor cleaning robot that performs a cleaning operation in which the robot 100 is propelled across the floor surface 10 while the robot 100 cleans the floor surface. During the cleaning operation, referring to FIG. 1B, the robot 100 accumulates electric charge (e.g., negative charge 102) due to contact between exterior portions of the robot 100 and the floor surface 10. Several regions of contact 101a-101e (shown in FIG. 1A) between the robot 100 and the floor surface 10 cause the robot 100 to accumulate electric charge. As described herein, the robot 100 includes an electrostatic discharge assembly 104 that dissipates the electric charge (e.g., negative charge 102) to mitigate any risk of damage to electrical circuitry 106 of the robot 100 that may occur as a result of abrupt discharge of the electric charge (e.g., negative charge 102).

FIGS. 2A-2E depict an example of the robot 100. Referring to FIG. 2A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 1A) of the robot 100 relative to the floor surface is, for example, no more than 13 centimeters. A bottom horizontal surface 152 (shown in FIG. 1A) of the robot housing 108 is no more than 0.7 cm from the floor surface. The robot 100 is also compact. An overall length L1 (shown in FIG. 1A) of the robot 100 an overall width W1 (shown in FIGS. 2A, 2E) are each between 30 and 60 centimeters, e.g., between 30 and 40 centimeters, 40 and 50 centimeters, or 50 and 60 centimeters.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. In the example depicted in FIG. 2A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

In the example depicted in FIGS. 1A and 2A-2D, the robot 100 is an autonomous mobile floor cleaning robot that includes a cleaning assembly 116 (shown in FIG. 2A) operable to clean the floor surface 10. For example, the robot 100 is a vacuum cleaning robot in which the cleaning assembly 116 is operable to clean the floor surface 10 by ingesting debris 105 (shown in FIG. 1A) from the floor surface 10. The cleaning assembly 116 includes one or more rotatable members, e.g., rotatable members 118 driven by a motor 120. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100.

As shown in FIG. 2A, the rotatable members 118 are rollers that counter-rotate relative to one another. The rotatable members 118 include elastomeric shells that contact debris 105 on the floor surface 10 to direct debris 105 through a gap between the rotatable members 118 and into an interior of the robot 100, e.g., into a debris bin 124 (shown in FIG. 1A), as the rotatable members 118 rotate relative to the housing infrastructure 108. The rotatable members 118 further contact the floor surface 10 to agitate debris 105 on the floor surface 10.

The robot 100 further includes a vacuum assembly 119 operable to generate an airflow through the gap between the rotatable members 118 and into the debris bin 124. The vacuum assembly 119 includes an impeller and a motor to rotate the impeller to generate the airflow. The vacuum assembly 119 cooperates with the cleaning assembly 116 to draw debris 105 from the floor surface 10 into the debris bin 124. In some cases, the airflow generated by the vacuum assembly 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum assembly 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126. The brush 126 is a side brush laterally offset from a fore-aft axis FA of the robot 100 such that the brush 126 extends beyond one of the lateral sides 130 of the housing infrastructure 108 and is thereby capable of engaging debris on portions of the floor surface 10 that the rollers 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond a front surface of the housing infrastructure 108. The brush 126 is positioned to contact the floor surface 10 during its rotation so that the brush 126 can easily engage the debris 105 on the floor surface 10.

The electrical circuitry 106 includes, in addition to the controller 109, a memory storage element 144 and a sensor system with one or more electrical sensors. The memory storage element 144 is accessible by the controller 109 and disposed within the housing infrastructure 108. The one or more electrical sensors are configured to detect features in an environment of the robot 100. For example, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Figure 2B:
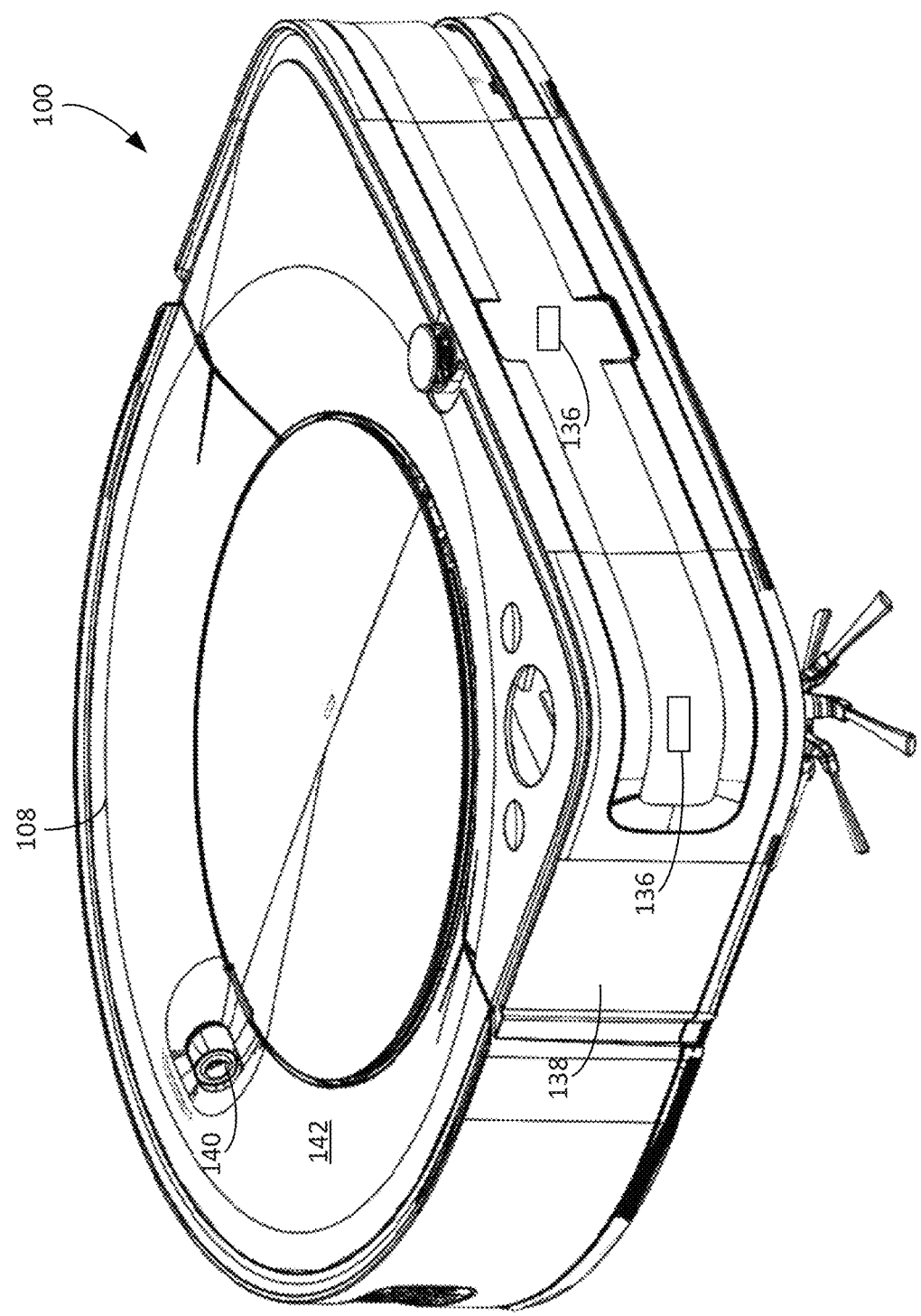

Referring to FIG. 2B, the sensor system includes proximity sensors 136 disposed proximate the front surface of the housing infrastructure 108. Each of the proximity sensors 136 is an optical sensor facing outward from the front surface of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and a bumper sensor (not shown) that detect contact between the bumper 138 and obstacles in the environment. The bumper 138 forms part of the housing infrastructure 108. The proximity sensors 136 can detect objects before the robot 100 contacts the objects, and the bumper sensor can detect objects that contact the bumper 138.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum assembly 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136, and the bumper sensor, to enable the robot 100 to avoid obstacles within the environment of the robot 100 during the mission.

The sensor data can be used by the controller 109 for simultaneous localization and mapping (SLAM) techniques in which the controller 109 extracts features of the environment 10 represented by the sensor data and constructs a map of the floor surface 10 of the environment. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as traversable space, and locations of open floor space are indicated on the map as nontraversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during another mission. For example, the other mission is a subsequent mission occurring after the mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enables the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment using the persistent map to optimize paths taken during the missions.

In this regard, the robot 100 includes mechanisms to protect the persistent data from being corrupted so that the cleaning efficiency of the robot 100 can be maintained. The data could be corrupted by electrical interference introduced into the electrical circuitry 106. To inhibit the likelihood of data corruption, the robot 100 includes mechanisms to inhibit sudden electrostatic discharge that could cause loss of stored data, e.g., including the persistent map or any software stored on the memory storage element 144.

The sudden electrostatic discharge can occur as a result of accumulated electrostatic charge on the robot 100. During the mission, as the robot 100 is propelled along the floor surface 10 to clean the floor surface 10, exterior portions of the robot 100 contact the floor surface 10 and, as a result of the triboelectric effect, accumulate the electric charge 102, as shown in FIG. 1B. For example, these exterior portions include portions of the drive wheels 112, the caster wheel 115, the bottom portion 113 of the housing infrastructure 108, and the rotatable members 118. As shown in FIG. 1A, the brush 126 contacts the floor surface 10 in the region of contact 101a. The rotatable members 118 contact the floor surface 10 in the regions of contact 101b, 101c. The drive wheels 112 contact the floor surface in the regions of contact 101d. The caster wheel 115 contacts the floor surface 10 in the region of contact 101e. Other components, including the housing infrastructure 108, can contact the floor surface 10 and collect electric charge 102. For example, if the floor surface 10 includes carpet, the carpet can include fibers that extend upwardly a sufficient distance to contact the bottom portion of the housing infrastructure 108. Some or all of these components of the robot 100 include plastic components that accumulate the electric charge 102 but cannot easily dissipate the electric charge 102.

Due to electrostatic induction and direct charge transfer from the charged plastic components to the electrical circuitry 106 (e.g., through the ionization and creepage), the electrostatic potential of the electrical circuitry 106 can increase. For example, the electric charge 102 can induce an electric charge 103 on the electrical circuitry 106 of the robot 100. When a conductive portion of the robot 100 is positioned near an external conductive object, the electric charge 103 can abruptly discharge from the robot 100 to the external conductive object, potentially damaging the electrical circuitry 106 or causing loss of data stored on the memory storage element 144.

Referring to FIG. 1B, the robot 100 includes the electrostatic discharge assembly 104 that dissipates the electric charge 103 into the environment of the robot 100. The electrostatic discharge assembly 104 dissipates the electric charge 103 at a rate that at least partially counteracts the rate at which the electric charge 102 is accumulated on the plastic components of the robot and the rate at which the negative electric charge 103 is induced by electrostatic induction and charge transfer, into the electrical circuit 106. When the robot 100 is travelling along the floor surface 10, the electrostatic discharge assembly 104 can maintain a lower potential on the electrical circuitry 106, thereby reducing the risk of sudden electrostatic discharge. In particular, the electrostatic discharge assembly 104 can reduce the intensity of sudden electrostatic discharges such that if a sudden electrostatic discharge occurs, the discharge poses little risk to the electrical circuitry 106. The electrostatic discharge assembly 104 includes a distal tip portion 156. The distal tip portion 156 is configured to protrude from the housing infrastructure 108. The distal tip portion 156 is configured to contact another object (e.g., a metal threshold, floor surface material, etc.) that typically includes an electrical conductor in order to discharge the electrostatic discharge assembly 104.

Referring to FIG. 2A, the electrostatic discharge assembly 104 includes electrostatic discharge members 150a, 150b electrically connected to the electrical circuitry 106 and configured to dissipate the electric charge 103 into the environment of the robot 100. The electrostatic discharge members 150a, 150b are electrically conductive members that are positioned near the floor surface 10, to increase the rate of electrostatic discharge from the robot 100.

The electrostatic discharge members 150a, 150b are positioned between rearward portion 121 of the housing infrastructure 108, along the bottom portion 113 of the housing infrastructure 108 and near contacts 210a, 210b. The contacts 210a, 210b include metallic surfaces that interface with metallic contacts for charging a power system (e.g., a battery) of the robot 100. The electrostatic discharge members 150a, 150b are positioned to face the floor surface upon which the robot 100 moves in order to increase the strength of the electric field and the discharge rate. The electrostatic discharge members 150a, 150b are within an outer perimeter of the robot 100 and within an outer perimeter of the housing infrastructure 108. The positioning of the electrostatic discharge members 150a, 150b is described below in more detail in relation to FIG. 2E.

Figure 2C:
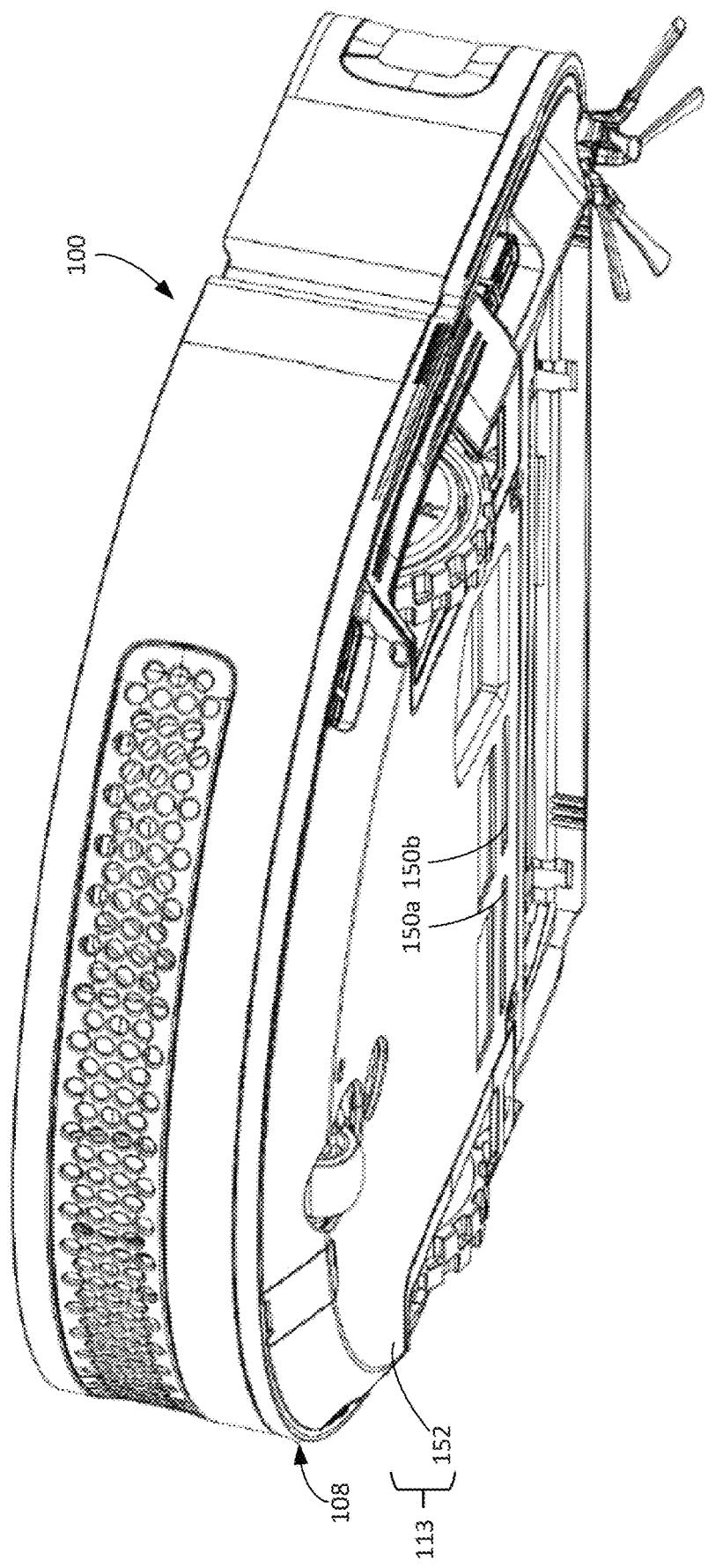
Figure 2D:
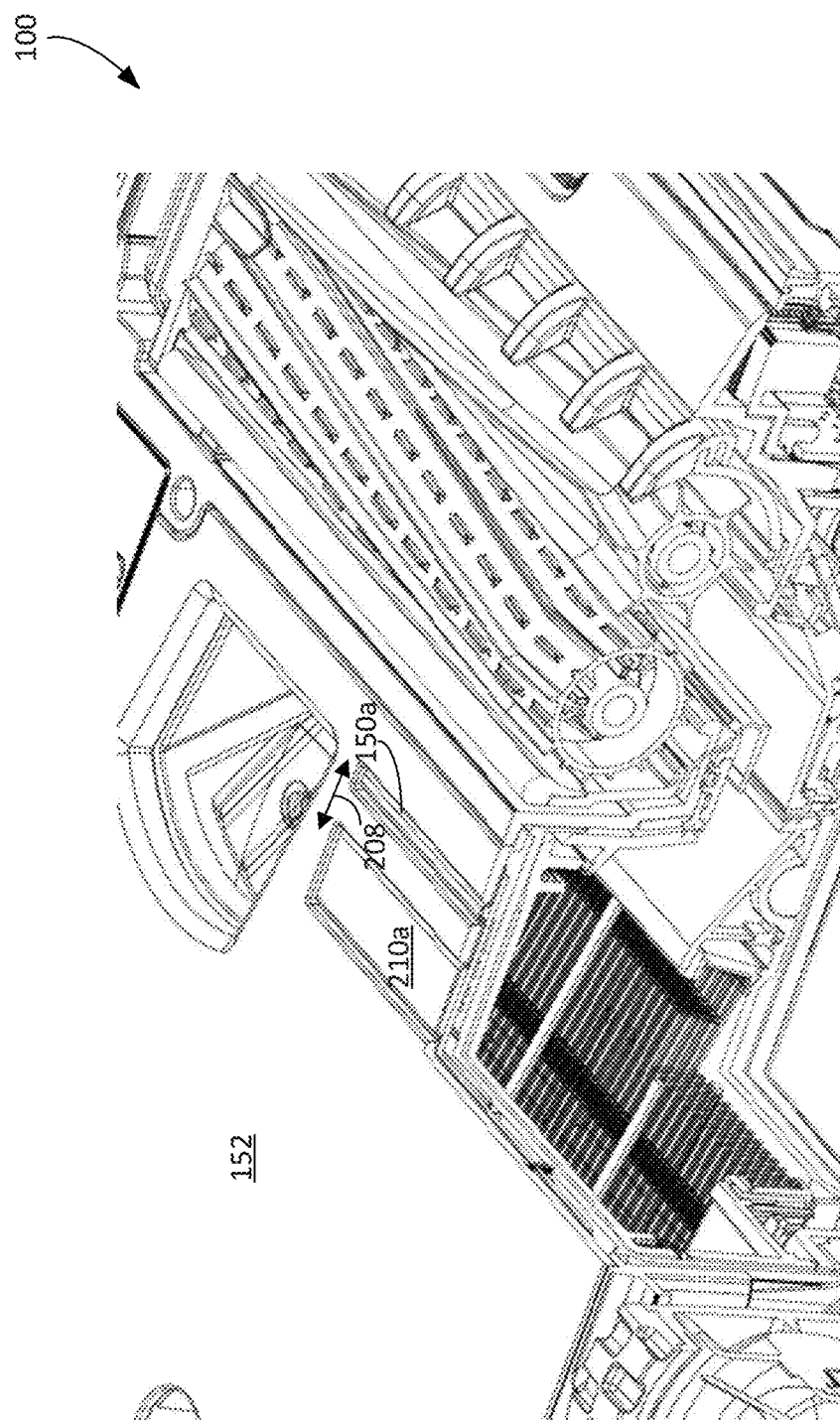

As shown in FIGS. 2A and 2C-2E, the electrostatic discharge members 150a, 150b extend, from the electrical circuitry 106, through the bottom portion 113 of the housing infrastructure 108 to an exterior of the housing infrastructure 108. For example, as shown in FIGS. 2C-2D, the bottom portion 113 of the housing infrastructure 108 corresponds to a bottom facing portion of the housing infrastructure 108 and includes the horizontal bottom surface 152. The electrostatic discharge members 150a, 150b extend through the bottom surface 152 of the bottom portion 113. The horizontal bottom surface 152 is approximately parallel to the floor surface 10.

Referring back to FIG. 1A, the electrostatic discharge member 150 extends downward from the housing infrastructure 108 and downward toward the floor surface 10. A distance D1 (shown in FIG. 1A) between a distal tip portion 156 of the electrostatic discharge member 150 and the floor surface 10 is between 0 and 1 cm. The distance D1 may vary depending on the type of the floor surface 10 on which the robot 100 is positioned. For example, if the floor surface 10 includes carpet, the distance D1 may be between 0 cm and 2 cm, while the distance D1 may be between 0.8 cm and 1.1 cm if the floor surface 10 is a hard surface. The electrostatic discharge member 150 is positioned above the floor surface 10 such that the electrostatic discharge member 150 does not normally contact the floor surface 10 during the mission and while the robot 100 travels along the floor surface 10. For example, depending on the type of the floor surface 10, the electrostatic discharge member intermittently contacts the floor surface 10. If the floor surface 10 is a hard surface, the electrostatic discharge members 150a, 150b tend to not contact the floor surface 10 as the robot 100 travels across the floor surface 10, whereas if the floor surface 10 is a carpet, the electrostatic discharge member 150 may occasionally contact the floor surface 10 as the robot 100 travels across the floor surface 10. By being positioned near the floor surface 10, the electrostatic discharge member 150 can discharge electrostatic charge of the robot 100 more quickly, thus rendering the electrostatic discharge member 150 more effective.

The electrostatic discharge members 150a, 150b extend downward near the center of the robot 100 along an axis 158 that forms an angle that is approximately 90 degrees with the floor surface 10. The electric field is increased around the electrostatic discharge member 150, and the rate of discharge is accordingly increased. The distal tip portion 156 of the electrostatic discharge members 150a, 150b forms a plate surface that is approximately parallel to the floor surface 10. In some implementations, the distal top portion 156 does not extend from the bottom portion of the robot but instead is recessed slightly (<0.5 mm) in the robot.

Figure 2E:
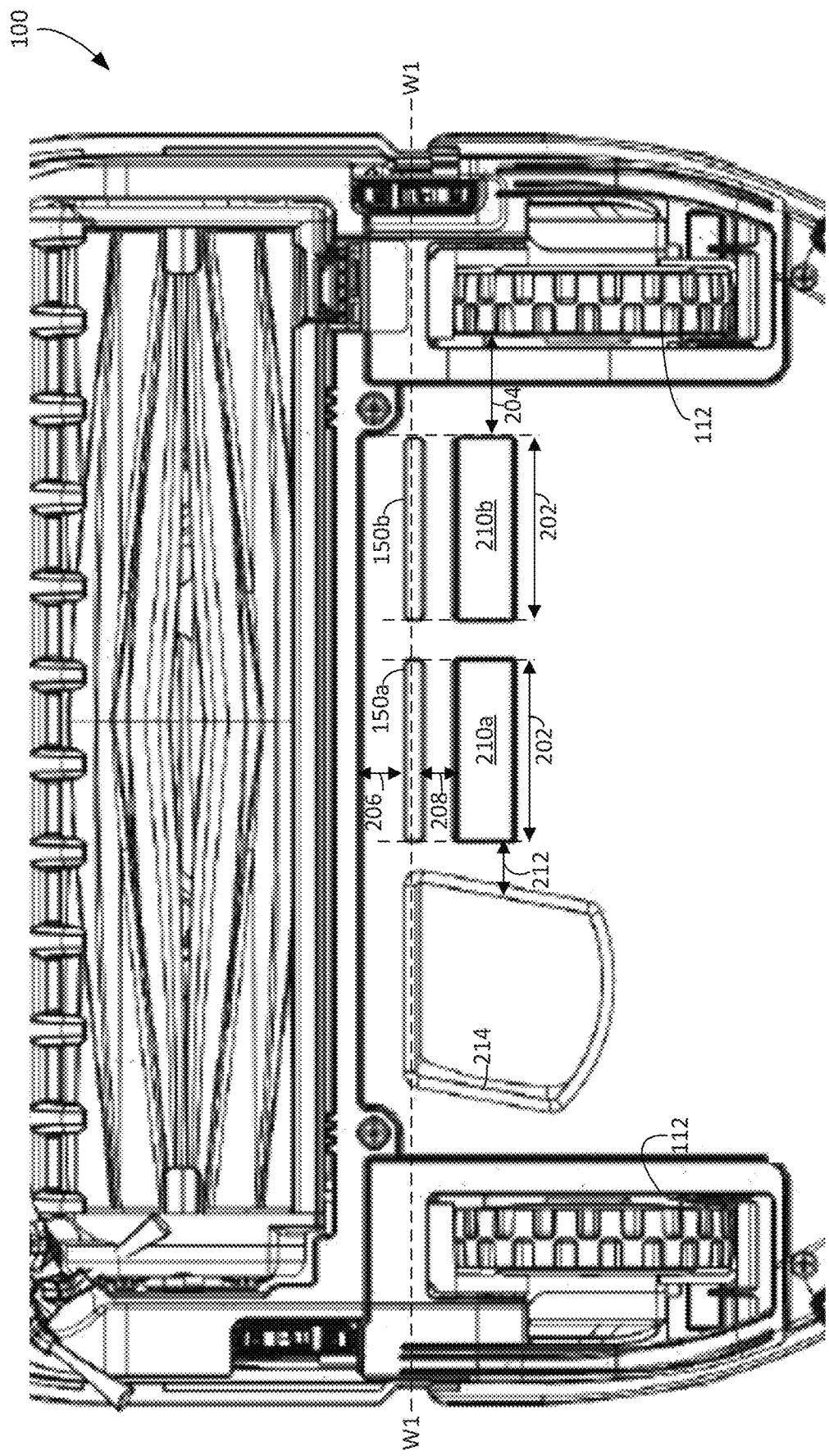
FIG. 2E is a bottom view of a portion of the robot of FIG. 1A.

Turning to FIG. 2E, a bottom view of the robot 100 is show. The electrostatic discharge members 150a, 150b protrude from the bottom of the robot 100. In some implementations, the electrostatic discharge members 150a, 150b are aligned along a lateral axis W1 of the robot. The electrostatic discharge members 150a, 150b have dimensions of approximately 2-5 mm by 20-50 mm. The electrostatic discharge members 150a, 150b are aligned with contacts 210a, 210b. Contacts 210a, 210b are used to charge a power system of the robot 100. Alignment of the electrostatic discharge members 150a, 150b with the contacts 210a, 210b facilitates discharge of the electrostatic discharge members 150a, 150b during docking, such as for recharging the power system of the robot 100 or evacuation of the robot 100 via evacuation port 214.

The electrostatic discharge members 150a, 150b are at least as long as the lengths 202 of charging contacts 210a, 210b. The electrostatic discharge members 150a, 150b encounter objects in a cleaning environment, such as on the floor surface 10, before the charging contacts 210a, 210b as the robot 100 moves in a forward direction. The electrostatic discharge members 150a, 150b are placed 5-10 mm (e.g., typically 5-8 mm) in front of the charging contacts 210a, 201b. The electrostatic discharge members 150a, 150b are near the charging contacts so that the electrostatic discharge members 150a, 150b encounter the same objects in the environment as the contacts 210a, 210b. If an object is encountered that can discharge to or from the robot 100, that discharge occurs on the electrostatic discharge members 150a, 150b, which have a relatively high impedance, rather than the charging contacts 210a, 210b, which have a relatively low impedance. The electrostatic discharge members 150a, 150b are spaced from the charging contacts 210a, 210b to have sufficient creepage distance and avoid arcing around the in-line impedance on the electrostatic discharge members 150a, 150b.

The electrostatic discharge members 150a, 150b are spaced approximately at least 2 mm to 5 mm from each other and are spaced distance 208 from the contacts 210a, 210b, respectively. In some implementations, the distance 208 is between 1% and 5% of the length of the robot 100. In some implementations, the distance 208 is between 3 mm 5 mm.

The electrostatic discharge members 150a, 150b are spaced inwardly from the one or more wheels of the drive system by distance 204. Distance 204 can be 1 cm-5 cm. In some implementations, the width 204 is between 1% and 5% the width of the robot 100 along axis W1. The electrostatic discharge members 150a, 150b are at a position on the bottom of the robot 100 so that the electrostatic discharge members 150a, 150b are distance from the controller and other electronic circuitry that is susceptible to static discharge. The electrostatic discharge members 150a, 150b are placed centrally to enable an increased rate of collection of the static charge at the electrostatic discharge members 150a, 150b and to increase the rate of discharge. The electrostatic discharge members 150a, 150b are placed forward of the charging contacts 210a, 210b to ensure that the electrostatic discharge members 150a, 150b are leading the charging contacts 210a, 210b when the robot 100 is moving in a forward direction.

In some implementations, electrostatic discharge members 150a, 150b are placed anywhere on the bottom of the robot 100, as long as the electrostatic discharge members 150a, 150b are forward of the charging contacts 210a, 210b such that the charging contacts trail the electrostatic discharge members 150a, 150b when the robot 100 moves in a forward direction. In this way, the electrostatic discharge members 150a, 150b act as the point of discharge of the electrostatic charge, and not contacts 210a, 210b. For example, if the contacts 210a, 210b are near a rearward portion of the bottom of the robot 100, the electrostatic discharge members 150a, 150b can be placed distance 208 in front of the charging contacts 210a, 210b. In this way, distances 204, 206, and 212 can be virtually any combination of values that allow the electrostatic discharge members 150a, 150b and the contacts 210a, 210b to maintain their relative positions to each other on the bottom of the robot 100. While two electrostatic discharge members 150a, 150b are shown, the electrostatic discharge member can be a single member that extends in front of both charging contacts 210a, 210b.

Figure 3A:
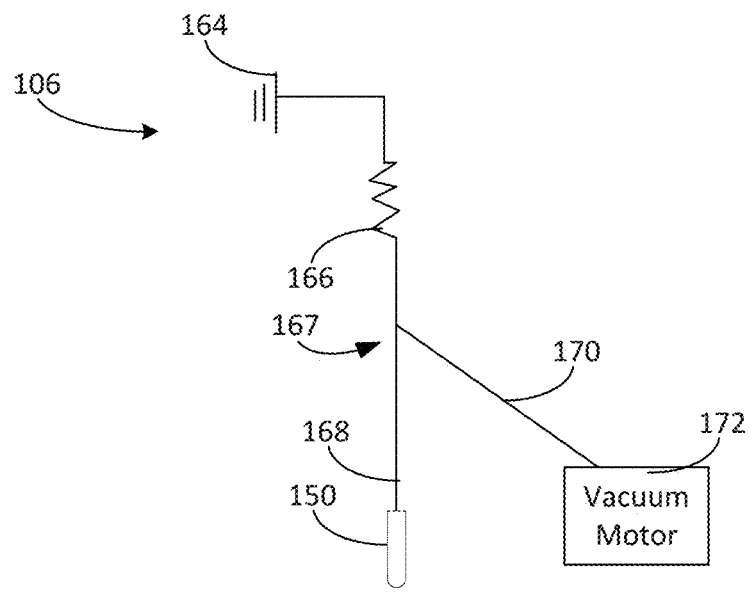
FIGS. 3A-3B are diagrams of an electrical circuit including the electrostatic discharge assembly of FIG. 1A.

Referring to FIG. 3A, the electrostatic discharge member 150 is electrically connected to the electrical circuitry 106 through an electrical wire 162. For example, the electrical wire 162 connects the electrostatic discharge member 150 to a ground terminal, e.g., to an electric ground 164 (shown in FIG. 4) of the electrical circuitry 106. The electrical circuitry 106 includes an electrical resistor 166 (or multiple resistors) that electrically connects the electrostatic discharge member 150 and the electrical circuitry 106. The electrical resistor 166 electrically connects the electric ground 164 (e.g., of the circuitry 106) and the electrostatic discharge member 150 and increases the electrical resistance between the electric ground 164 and the electrostatic discharge member 150. The electric resistor 166 has an electrical resistance between 1 Kilo-Ohm and 1 Mega-Ohm (e.g., approximately 150KΩ total resistance for the electrostatic discharge member circuit). This increased electrical resistance can reduce the discharge current through the electrostatic discharge member 150 to reduce the risk of sudden electrostatic discharge through the electrostatic discharge member 150. For example, the electrical resistor 166 can prevent high discharge current through the electrostatic discharge member 150 if the electrostatic discharge member 150 comes into contact with an external conductive object, e.g., a human user, a metal threshold, or other external conductive object.

Figure 3B:
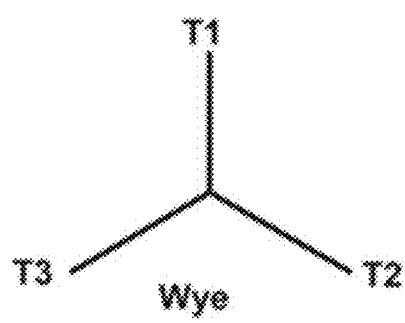

In some implementations, electrostatic discharge members 150a, 150b each are tied to ground using separate resistors (or series of resistors). Each of the electrostatic discharge members 150a, 150b includes a resistance of approximately half the total resistance of the circuit (e.g., 75 kΩ for each member for a 150 kΩ circuit). For example, resistors can have 150KΩ total, and the construction of the circuit can be on a printed circuit board (see board 400 of FIGS. 4A-4B). The charging contacts and electrostatic discharge members 150a, 150b are soldered to the board 300. The physical distance across the resistors is large enough to prevent arcing. In the example of FIG. 3B, three (3) 75 Kohm surface mount resistors are used, and are set up in a topology similar to a Wye wound motor. In this particular example, T1 is ground, T2 and T3 represent the electrostatic discharge members 150a, 150b, where each branch is 75 kohms. While such a configuration is one of many possible circuits, this configuration enables placement of 150KΩ resistors between the electrostatic discharge members 150a, 150b and ground with while maintaining the creepage distance 208 between the charging contacts 210a, 210b and the electrostatic discharge members 150a, 150b.

Figure 4A:
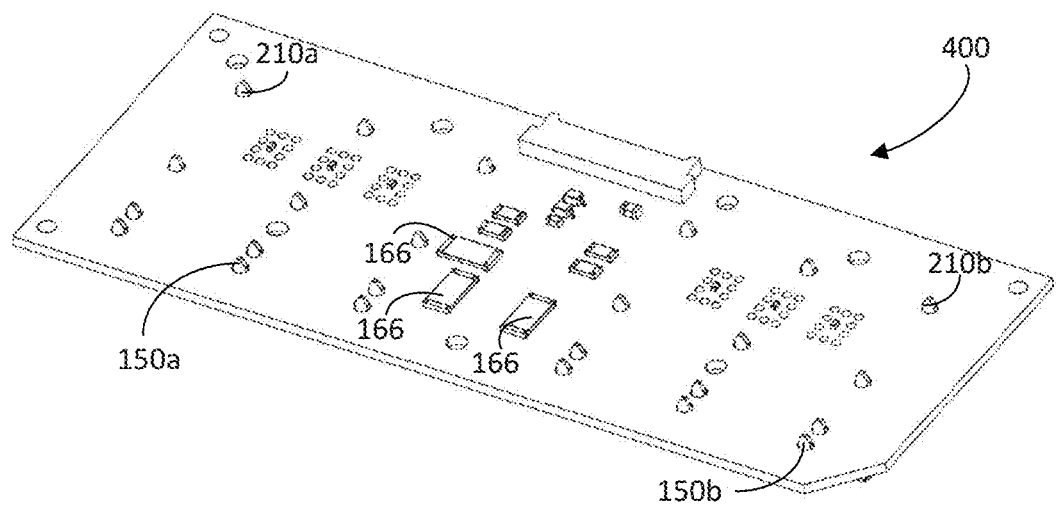
FIGS. 4A, 4B are perspective views of a board to which an electrostatic discharge member is mounted.
Figure 4B:
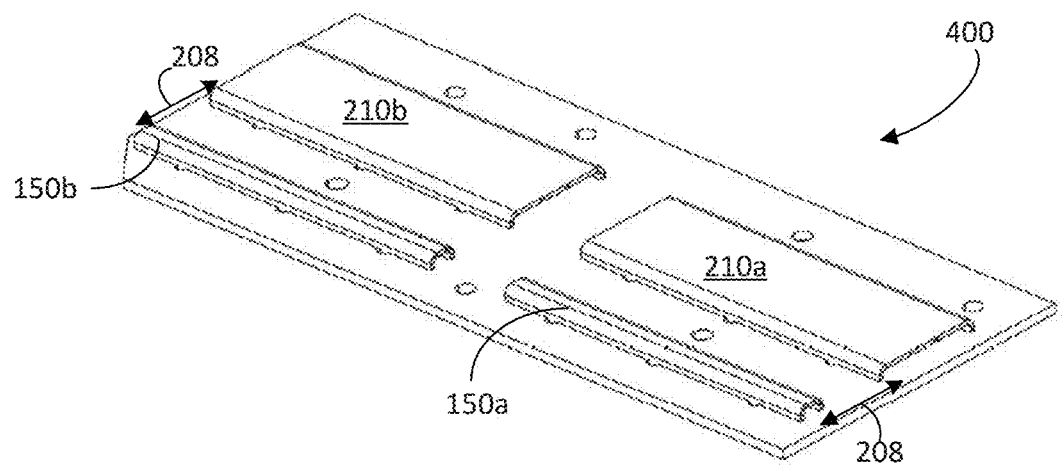

Turning to FIGS. 4A-4B, the circuit board 400 of the electrostatic discharge members 150a, 150b circuit is shown. FIG. 4A show a top perspective view of board 400, and FIG. 4B shows a bottom perspective view of board 400.

In some implementations, the board 400 includes both the electrostatic discharge members 150a, 150b and the charging contacts 210a, 210b. Creepage distance 208 is maintained on the board 400. Board 400 can be placed anywhere on the bottom of the robot 100 that enables docking of the robot 100 to occur.

While the configuration shown in FIGS. 2E, 4A-4B is one example, other configurations of electrostatic discharge members 150a, 150b and the charging contacts 210a, 210b are possible. In some implementations, a single electrostatic discharge member 150 can be used. However, having several discrete electrostatic discharge members ensures greater structural integrity to the bottom of the robot 100 (e.g., to a robot cover) than one extended electrostatic discharge member 150. In some implementations, an electrostatic discharge member 150 forms a guard ring all the way around the charging contacts 210a, 210b and provides protection to the charging contacts 210a, 210b from accidental electrostatic discharge no matter what direction the robot 100 travels. Creepage distance 208 is maintained in this scenario.

Figure 5A:
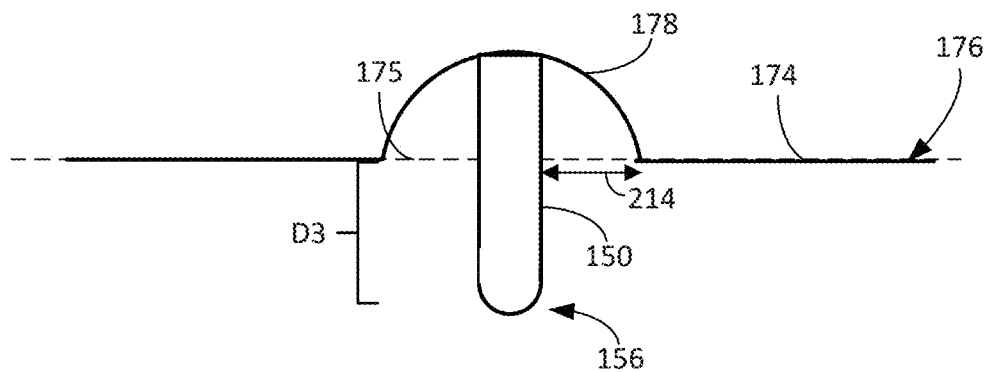
FIG. 5A is a diagram that models a portion of an electrostatic discharge assembly protruding from a robot housing.

Referring to FIG. 5A, the distal tip portion 156 of the electrostatic discharge member 150 extends outwardly from the housing infrastructure 108 a sufficient distance to enable electrostatic charge to be dissipated away from the robot 100 and toward objects in the environment, e.g., the air, the floor surface 10, and other environmental objects. By extending beyond the housing infrastructure 108, a minimum distance D3 between the distal tip portion 156 of the electrostatic discharge member 150 and a plane 175 along which an exterior surface 174 of the housing infrastructure 108 extends is at least 1 millimeter, at least 2 millimeters, or at least 3 millimeters. The exterior surface 174 corresponds to an exterior surface of the bottom portion 113 (shown in FIG. 2C) of the housing infrastructure 108. Such an arrangement between the distal tip portion 156 and the housing infrastructure 108 can prevent the dissipated charge from accumulating on the housing infrastructure 108 and slowing down the discharge process from the robot 100. For example, the arrangement can reduce the portion of the paths of discharge of accumulated charge from the electrostatic discharge member 150 that the housing infrastructure 108 blocks. In particular, by extending beyond the housing infrastructure 108, additional paths of electrostatic discharge are made available for the electrostatic discharge member 150.

Continuing in reference to FIG. 5A, the electrostatic discharge member 150 is spaced a distance 214 from the housing infrastructure 108. The distance can be 1 mm to 10 mm. The spacing 214 is sized to ensure that charge (e.g., charge 102) buildup on the electrostatic discharge member 150 does not adversely affect other systems of the robot 100. For example, any size gap 214 is suitable that prevents the electrostatic discharge member 150 from shorting to other robot systems.

Figure 5B:
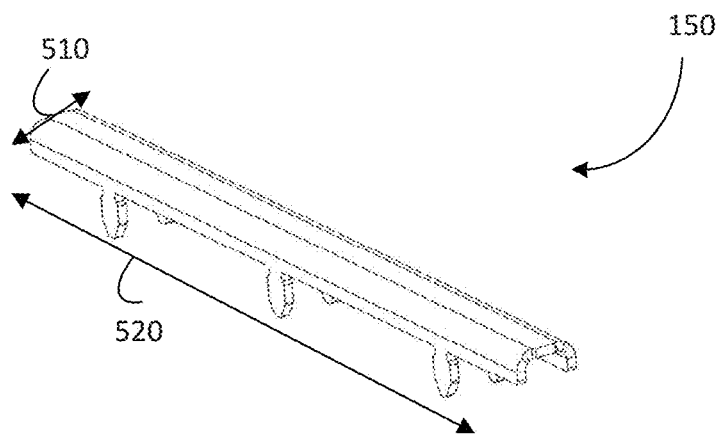
FIG. 5B is perspective view of an electrostatic discharge member.

Turning to FIG. 5B, in some implementations, the distal tip portion 156 of the electrostatic discharge member 150 is rounded to prevent the electrostatic discharge member from getting stuck or snagged on the floor surface 10 or a discharge contact on a docking station. In some implementations, the electrostatic discharge member 150 is 15-20 mm long as shown by distance 520 and 3-5 mm wide as shown by distance 510. In some implementations, the bottom of the electrostatic discharge member 150 is flat with rounded edges 530.

The member is formed of a metal material. In some other implementations, the electrostatic discharge member 150 is formed of stainless steel, conductive acrylic, nickel-brass, or other conductive material. In some implementations, the electrostatic discharge member 150 is formed of a material that can be soldered to board 400 of FIGS. 4A-B. At least a portion of the member is positioned within the assembly housing 182, extends through the assembly housing 182, and terminates outside of the assembly housing 182. The solid electrostatic discharge member 150 is more durable than a carbon fiber brush.

Referring back to FIG. 5A, the electrostatic discharge member 150 can have improved electrostatic discharge when the electrostatic discharge member 150 includes sharp geometry, e.g., corners and other non-linear geometry. The distal tip portion 156 of the electrostatic discharge member 150 has a non-uniform geometry to achieve this sharp geometry. The minimum distance between the distal tip 156 and the plane 175 are between 0 mm and 1.25 mm, e.g., no more than 1.25 mm. The overall length of the member is between 3 mm and 20 mm, e.g., between 3 mm and 5 mm, 5 mm and 10 mm, or 10 mm and 20 mm.

Controllers and computing devices can implement these operations and other processes and operations described herein. As described above, the controller 109 of the robot 100 can include one or more processing devices connected to the various components, systems, and subsystems of the apparatus 100. The controller 109 can coordinate the operation and cause the apparatus 100 to carry out the various functional operations or sequence of steps described above.

While the robot 100 has been described as an autonomous mobile floor cleaning robot, in some implementations, the robot 100 is an autonomous mobile patrol robot that moves about the floor surface 10 to monitor one or more rooms in an enclosed space, e.g., a home, an office, a hospital, a warehouse, a manufacturing facility, or other enclosed space. Electrical circuitry of the patrol robot includes additional electrical devices that can be protected from abrupt electrostatic discharge through the electrostatic discharge assembly 104. For example, the patrol robot includes an image capture system including a camera that enables the patrol robot to capture digital imagery of the enclosed space. The electrostatic discharge assembly of the patrol robot can protect the image capture system from harm due to sudden electrostatic discharge.

While the cleaning assembly 116 of the robot 100 that contacts the floor surface 10 has been described as including the rotatable members 118, in some implementations, the cleaning assembly 116 includes a single rotatable member that is rotated to ingest the debris. Alternatively, the cleaning assembly 116 includes a cleaning pad that contacts different portions of the floor surface 10 as the robot 100 is navigated along the floor surface 10. The robot 100 is controllable in a manner such that the cleaning pad scrubs the floor surface 10 to remove debris on the floor surface 10.

While the cleaning assembly 116 has been described as including two rotatable members 118, in some implementations, the cleaning assembly 116 includes a single rotatable member that rotates to direct debris toward the debris bin 124. The one or more rotatable members can be rollers with elastomeric outer portions in some implementations, while in other implementations, the one or more rotatable members include bristle brushes.

While the electrostatic discharge assembly 104 has been described as including the locator members 188, 190, in some implementations, the electrostatic discharge assembly 104 includes one, both, or neither of these locator members.

In some implementations, the robot 100 includes multiple electrostatic discharge members 150a, 150b, as shown in FIG. 2A. The electrostatic discharge members can be arranged around a perimeter of the housing infrastructure 108, with one or more electrostatic discharge members along the rearward portion 121 of the housing, one or more electrostatic discharge members proximate the lateral sides 130 of the housing infrastructure 108, and one or more electrostatic discharge members along the forward portion 122 of the housing infrastructure 108. The electrostatic discharge members are separated from one another by a distance of at least, for example, 6 to 10 cm, e.g., 6 to 8 cm, 7 to 9 cm, 8 to 10 cm. For example, if the robot 100 includes two electrostatic discharge members, the two electrostatic discharge members are separated by a distance of at least, for example, 6 to 10 cm, e.g., 6 to 8 cm, 7 to 9 cm, 8 to 10 cm.

While the electrostatic discharge member 150 has been described as being disposed on the rearward portion 121 of the housing infrastructure 108, in other implementations, the electrostatic discharge member 150 is positioned on the forward portion 122 of the housing infrastructure 108. Alternatively or additionally, the electrostatic discharge member 150 is positioned proximate the lateral sides of the housing infrastructure 108. In some implementations, at least a portion of the electrostatic discharge assembly 104 is disposed within the debris bin 124. For example, the electrostatic discharge member 150 extends through an exhaust of the debris bin 124.

Figure 6:
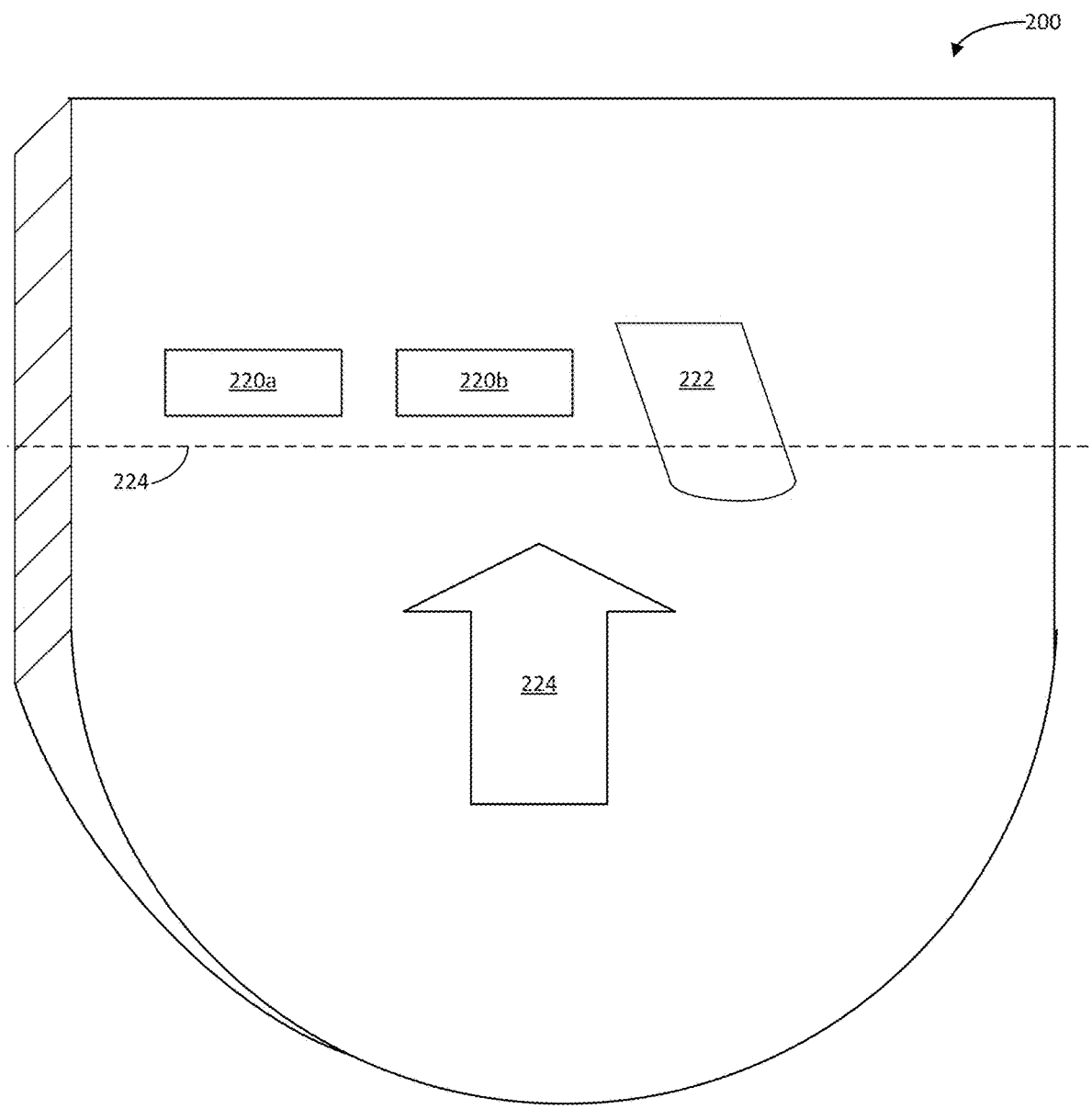
FIG. 6 is a view of a docking station configured to discharge the electrostatic discharge assembly robot of FIG. 1A.

FIG. 6 shows a docking station 200. The docking station 200 includes charging contacts 220a, 220b for recharging the robot 100, and an evacuation port 222 for evacuating debris from the robot (e.g., from a bin of the robot). The robot 100 docks with the docking station 200 by maneuvering in the direction of arrow 224. The robot 100 positions itself so that charging contacts of the robot (e.g., contacts 210a, 210b of FIGS. 2A, 2E) touch the charging contacts 220a, 220b, respectively, of the docking station 200. The evacuation port (e.g., evacuation port 214 of FIG. 2E) of the robot 100 aligns with the evacuation port 222 of the docking station 200. The electrostatic discharge members 150a, 150b (e.g., of FIGS. 2A, 2E) are positioned forward of the charging contacts 210a, 210b on the robot 100 to so that the electrostatic discharge members first cross over the charging contacts 210a, 210b of the docking station 200 while the robot is docking. For example, the electrostatic discharge members 150a, 150b will pass line 224 illustrated on FIG. 6 and touch the charging contacts 220a, 220b. Such a configuration of electrostatic discharge members 150a, 150b relative to the charging contacts 210a, 210b of the robot 100 ensures that the electrostatic discharge members 150a, 150b can electrically discharge via the charging contacts 220a, 220b of the docking station 200. Such a configuration of the electrostatic discharge members 150a, 150b relative to the charging contacts 210a, 210b of the robot 100 also enables the robot to dock with greater flexibility because the configuration allows the robot's charging contacts 210a, 210b to pass line 224 during docking without accidentally discharging electrostatic charge on the robot 100 through the charging contacts 210a, 210b to the docking charging contacts 220a, 220b. As a result, the robot 100 can maneuver during docking (e.g., aligning evacuation port 214 with port 222 or aligning charging contacts 210a, 210b, with contacts 220a, 220b, respectively) without risking accidental electrostatic discharge through the charging contacts 210a, 210b of the docking station 200. In this way, the electrostatic discharge members 150a, 150b purposely encounter the dock contacts 220a, 220b before the robot contacts to bleed off any electrostatic charge and bring the robot and dock to the same potential in a controlled manner. The electrostatic discharge members 150a, 150b are positioned so they and the charging contacts 210a, 210b cannot touch the dock contacts at the same time.

A number of implementations have been described. Nevertheless, it will be understood that various modifications may be made. Accordingly, other implementations are within the scope of the claims.

What is claimed is:

1. An autonomous mobile robot comprising:
a housing infrastructure;
a drive system comprising one or more wheels to support the housing infrastructure above a floor surface;
electrical circuitry positioned within the housing infrastructure, the electrical circuitry including a controller to initiate a cleaning operation in which the drive system propels the robot across the floor surface while the robot cleans the floor surface;
an electrostatic discharge assembly comprising an electrostatic discharge member having a metallic contact electrically connected to the electrical circuitry, the electrostatic discharge member extending to an exterior of the housing infrastructure; and
a charging contact configured to recharge a power system of the robot,
wherein the metallic contact and the charging contact are on a bottom portion of the housing infrastructure, and wherein the electrostatic discharge member is configured to touch a portion of a docking station as the robot docks with the docking station to enable the charging contact to recharge the power system of the robot.

2. The robot of claim 1, wherein:
the metallic contact protrudes less than 0.5 millimeters from the exterior of the housing infrastructure.

3. The robot of claim 1, further comprising a cleaning assembly, wherein:
the cleaning assembly comprises one or more rotatable members configured to contact the floor surface during the cleaning operation, thereby causing the robot to accumulate electrostatic charge, and
the electrostatic discharge member is configured to dissipate the accumulated electrostatic charge into an environment of the robot.

4. The robot of claim 1, wherein the electrostatic discharge member faces downward toward the floor surface.

5. The robot of claim 1, wherein a distance between the metallic contact of the electrostatic discharge member and the floor surface is between 0 centimeters and 1 centimeter.

6. The robot of claim 1, further comprising a cleaning assembly, wherein:
a height of the robot relative to the floor surface is no more than 13 centimeters, and
the electrostatic discharge member is positioned on the bottom portion of the housing infrastructure between the one or more wheels of the drive system and rearward of the cleaning assembly.

7. The robot of claim 1, wherein the metallic contact of the electrostatic discharge member is aligned with the charging contact.

8. The robot of claim 7, wherein the metallic contact of the electrostatic discharge member includes approximately a same lateral length as the charging contact, and wherein the metallic contact of the electrostatic discharge member is within 1 centimeter of the charging contact.

9. The robot of claim 1, wherein the electrostatic discharge member is a first electrostatic discharge member and wherein the metallic contact is a first metallic contact, and wherein the robot further comprises a second electrostatic discharge member including a second metallic contact that is aligned along a lateral axis with the first metallic contact of the first electrostatic discharge member.

10. The robot of claim 9, wherein the charging contact is a first charging contact, and the first metallic contact is aligned with the first charging contact, wherein the second metallic contact is aligned with a second charging contact for recharging the power system of the robot, and wherein widths of the first and second metallic contacts each include approximately a same lateral length as the first and second charging contacts, respectively.

11. The robot of claim 1, wherein the electrostatic discharge member is positioned on the bottom portion of the housing infrastructure within 2 centimeter of an evacuation port.

12. The robot of claim 1, wherein a minimum distance between the metallic contact of the electrostatic discharge member and an exterior wall of the housing infrastructure is at least 1 millimeter.

13. The robot of claim 1, wherein a width of the metallic contact is between 2 and 5 millimeters, and wherein a length of the metallic contact is between 10 and 50 millimeters.

14. The robot of claim 1, wherein a distance between the metallic contact of the electrostatic discharge member and a wheel of the drive system is between 1% and 5% of a width of the robot.

15. The robot of claim 1, wherein a distance between the metallic contact of the electrostatic discharge member and a charging contact of the robot is between 1% and 5% of a length of the robot.

16. The robot of claim 1, wherein:
a bottom surface of the housing infrastructure is no more than 0.7 centimeters from the floor surface, and
the electrostatic discharge member is positioned above the floor surface such that the electrostatic discharge member does not contact the floor surface during the cleaning operation on the floor surface.

17. The robot of claim 1, further comprising an assembly housing to which the electrostatic discharge member is mounted, the assembly housing comprising a locator member engaged with a corresponding locator member on the housing infrastructure to inhibit relative movement of a portion of the electrical circuitry and the electrostatic discharge member.

18. The robot of claim 1, further comprising a resistor electrically connecting the electrostatic discharge member and the electrical circuitry.

19. The robot of claim 18, wherein an electrical resistance of the resistor is between 1 Kilo-Ohm and 1 Mega-Ohm.

20. The robot of claim 1, wherein the electrostatic discharge member is connected to an electrical ground of the electrical circuitry.

21. The robot of claim 1, wherein the electrostatic discharge member is electrically connected to the electrical circuitry through an electrical wire.

22. The robot of claim 1, wherein the portion of the docking station is a discharge contact of the docking station, and the electrostatic discharge member is configured to touch the discharge contact of the docking station as the robot docks with the docking station to enable the charging contact to recharge the power system of the robot.

23. The robot of claim 1, wherein the electrostatic discharge member is configured to touch the portion of the docking station before the robot is in a docking position in which the charging contact recharges the power system of the robot.

24. The robot of claim 1, wherein the metallic contact comprises a plate surface approximately parallel to a floor surface.

25. An autonomous mobile robot comprising:
a housing infrastructure;
a drive system comprising one or more wheels to support the housing infrastructure above a floor surface;
electrical circuitry positioned within the housing infrastructure, the electrical circuitry including a controller to initiate a cleaning operation in which the drive system propels the robot across the floor surface while the robot cleans the floor surface;
an electrostatic discharge assembly comprising an electrostatic discharge member having a metallic contact electrically connected to the electrical circuitry, the electrostatic discharge member extending to an exterior of the housing infrastructure; and
a charging contact for recharging a power system of the robot, wherein the metallic contact of the electrostatic discharge member is aligned with the charging contact.

26. The robot of claim 25, wherein the metallic contact of the electrostatic discharge member is positioned in front of the charging contact.

27. The robot of claim 25, wherein the metallic contact is configured to touch a charging contact on a docking station as the robot docks with the docking station.

28. The robot of claim 27, wherein the metallic contact is configured to, as the robot docks with the docking station, touch the charging contact on the docking station before the charging contact of the robot touches the charging contact on the docking station.

29. The robot of claim 25, wherein the metallic contact of the electrostatic discharge member comprises approximately a same lateral length as the charging contact, wherein the metallic contact of the electrostatic discharge member is within 1 centimeter of the charging contact.

* * * * *